United States Patent
Camin et al.

(10) Patent No.: US 7,379,912 B1
(45) Date of Patent: May 27, 2008

(54) SYSTEM AND METHOD FOR PROCESSING LOAN INFORMATION

(75) Inventors: Rhoda K. Camin, Herndon, VA (US); Dionisia B. Coffman, Herndon, VA (US); Judith S. Lubnow, Arlington, VA (US); Michael J. Maddox, Alexandria, VA (US); Barry R. Ploff, Gaithersburg, MD (US)

(73) Assignee: Federal Home Loan Mortgage Corporation, McLean, VA (US)

( * ) Notice: Subject to any disclaimer, the term of this patent is extended or adjusted under 35 U.S.C. 154(b) by 1418 days.

(21) Appl. No.: 09/801,870

(22) Filed: Mar. 9, 2001

Related U.S. Application Data (60) Provisional application No. 60/188,165, filed on Mar. 10, 2000.

(51) Int. Cl.
*G06Q 40/00* (2006.01)
(52) U.S. Cl. .......................................... 705/38; 705/35
(58) Field of Classification Search .................. 705/38, 705/35
See application file for complete search history.

(56) References Cited

U.S. PATENT DOCUMENTS 5,878,403 A * 3/1999 DeFrancesco et al. ........ 705/38
5,930,776 A * 7/1999 Dykstra et al. ................ 705/38
6,385,594 B1 * 5/2002 Lebda et al. .................. 705/38
6,643,625 B1 * 11/2003 Acosta et al. ................. 705/38
6,993,505 B1 * 1/2006 Katz et al. ..................... 705/38

FOREIGN PATENT DOCUMENTS

EP 0919942 A2 * 6/1999

* cited by examiner

*Primary Examiner*—Jagdish N Patel
(74) *Attorney, Agent, or Firm*—Finnegan Henderson Farabow Garrett & Dunner LLP (57) ABSTRACT

Methods and systems are provided for processing information associated with a loan, such as a mortgage. In one embodiment, a method for processing loan information using a financial system includes, for example, receiving loan information from one or more source systems; storing the loan information in one or more staging tables; evaluating the loan information stored in the one or more staging tables using one or more triggers such that any one of the one or more triggers is satisfied based on one or more predetermined conditions; identifying one or more rules, when at least one of the one or more triggers is satisfied; retrieving stored loan information from at least one of the one or more staging tables to form retrieved information, when at least one of the one or more triggers is satisfied; and transforming the retrieved information into one or more outputs based on at least one of the one or more rules.

29 Claims, 4 Drawing Sheets

SYSTEM AND METHOD FOR PROCESSING LOAN INFORMATION

CROSS REFERENCE TO RELATED APPLICATION

This application claims the benefit of U.S. Provisional Patent Application No. 60/188,165, entitled "SYSTEM AND METHOD FOR CREDIT LOSS ACCOUNTING," filed on Mar. 10, 2000, the disclosure of which is expressly incorporated herein by reference in its entirety.

BACKGROUND OF THE INVENTION

I. Field of the Invention

The present invention generally relates to financial systems and to systems and methods for processing financial information. More particularly, the invention relates to systems and methods for processing information associated with a loan, such as a mortgage.

II. Background and Material Information

Financial systems receive information and process the received information to produce an output that is useful to a user, such as a business person. For example, a financial system may produce financial reports, financial summaries, and/or entries in a ledger.

Financial systems for processing loans in the banking and mortgage industry face numerous challenges. One of those challenges is associated with gathering and processing information during the life of a mortgage. For example, during the life of a mortgage, various business processes are associated with the mortgage including, for example, a mortgage may be entered into by a mortgagor and a mortgagee; a mortgagor may sell the mortgage to another mortgagor; a mortgage may be serviced by a mortgage servicer that may be independent from the mortgagor; a mortgage may go into delinquency status with past due mortgage payments; a mortgage may go into foreclosure status; a mortgagor may retake possession of the property after foreclosure; the repossessed property may generate income and/or expenses; the repossessed property may be resold which thus retires the original mortgage; a mortgage may be refinanced; a mortgage may be renegotiated (also referred to as a "work-out") at a new interest rate amount thus mitigating the risk of foreclosure.

The various business processes associated with the mortgage may not be under the control of a single financial institution, such as a mortgagor, mortgage servicer, or mortgage note owner. In fact, some of these business processes may be performed by one or more independent financial institutions or business entities. For example, an independent business entity, such as a mortgage servicer, may use a financial system that is separate and incompatible with the mortgagor's financial system even though the mortgagor requires information related to servicing a mortgage for accounting and financial reasons. Accordingly, when processing loans, such as mortgages, a lender or mortgagor faces a challenge when collecting and then processing information from various business entities with financial systems that may not be compatible with the mortgagor's financial system. As a result, the financial systems used to processes loans in the banking or mortgage industry may be costly and cumbersome to implement.

Returning to the example of the business process of servicing a mortgage, a mortgage servicer services the mortgage for a mortgagor by collecting mortgage payments from a mortgagee. Each collected mortgage payment creates a financial transaction or event. The mortgage servicer—as an independent business entity—may need to process the financial transaction to record the mortgage payment and make any necessary accounting entries. The mortgage servicer may then report the mortgage payment to the mortgagor. The mortgagor then makes the appropriate accounting entries and generates reports based on the reported information. Since the mortgage servicer may be a business entity that is independent and separate from the mortgagor, the mortgage servicer may maintain financial systems for servicing a mortgage that are separate from the mortgagor. Moreover, if the mortgage servicer makes a change affecting the format of the financial information collected by the mortgage servicer's financial system, the mortgagor may need to make a corresponding change to the mortgagor's financial system before receiving the mortgage servicer's information. Similarly, if the mortgagor makes a format change to its financial information, the mortgage servicer may need to make a corresponding change, which makes financial systems for the loan and mortgage industry cumbersome and costly to develop and maintain.

SUMMARY OF THE INVENTION

Accordingly, the present invention is directed to systems and methods for processing financial information and, more particularly, information associated with one or more loans, such as mortgages. A financial system consistent with the systems and methods of the present invention may receive loan information from one or more source systems and then store the loan information in one or more staging tables. The financial system may evaluate the loan information stored in the one or more staging tables using one or more triggers. Each of the one or more triggers is satisfied based on one or more predetermined conditions. The one or more predetermined conditions may be based on one or more financial events. The financial system may then identify one or more rules, when at least one of the one or more triggers is satisfied; and retrieve stored loan information from at least one of the one or more staging tables to form retrieved information, when at least one of the one or more triggers is satisfied. The financial system may then transform the retrieved information into one or more outputs based on at least one of the one or more rules.

Additional features and advantages of the invention will be set forth in part in the description which follows and in part will be obvious from the description, or may be learned by practice of the invention. The objectives and advantages of the invention may be realized and attained by the system and method particularly pointed out in the written description and claims hereof as well as the appended drawings.

To achieve these and other advantages and in accordance with the purpose of the invention, as embodied and broadly described herein, there is provided a method for processing loan information using a financial system including, for example, receiving loan information from one or more source systems; storing the loan information in one or more staging tables; evaluating the loan information stored in the one or more staging tables using one or more triggers such that any one of the one or more triggers is satisfied based on one or more predetermined conditions; identifying one or more rules, when at least one of the one or more triggers is satisfied; retrieving stored loan information from at least one of the one or more staging tables to form retrieved information, when at least one of the one or more triggers is satisfied; and transforming the retrieved information into one or more outputs based on at least one of the one or more rules.

According to another embodiment of the present invention, there is provided a financial system for processing loan information including, for example, at least one memory including code and at least one processor that executes the code. The at least one memory further includes code that receives information from one or more source systems, code that stores the loan information in one or more staging tables, code that evaluates the loan information stored in the one or more staging tables using one or more triggers such that any one of the one or more triggers is satisfied based on one or more predetermined conditions, code that identifies one or more rules, when at least one of the one or more triggers is satisfied, code that retrieves stored loan information from at least one of the one or more staging tables to form retrieved information, when at least one of the one or more triggers is satisfied, and code that transforms the retrieved information into one or more outputs based on at least one of the one or more rules.

Furthermore, in another embodiment of the present invention, there is provided a computer program product comprising computer-readable media having computer-readable code which, when run on a computer, causes the computer to process loan information, including the following computer-readable code for effecting actions in the computer: code for receiving loan information from one or more source systems; code for storing the loan information in one or more staging tables; code for evaluating the loan information stored in the one or more staging tables using one or more triggers such that any one of the one or more triggers is satisfied based on one or more predetermined conditions; code for identifying one or more rules, when at least one of the one or more triggers is satisfied; code for retrieving stored loan information from at least one of the one or more staging tables to form retrieved information, when at least one of the one or more triggers is satisfied; and code for transforming the retrieved information into one or more outputs based on at least one of the one or more rules.

In yet still another embodiment of the present invention, there is provided a system for processing loan information using a financial system including, for example, means for receiving loan information from one or more source systems; means for storing the loan information in one or more staging tables; means for evaluating the loan information stored in the one or more staging tables using one or more triggers such that any one of the one or more triggers is satisfied based on one or more predetermined conditions; means for identifying one or more rules, when at least one of the one or more triggers is satisfied; means for retrieving stored loan information from at least one of the one or more staging tables to form retrieved information, when at least one of the one or more triggers is satisfied; and means for transforming the retrieved information into one or more outputs based on at least one of the one or more rules.

Further, in still another embodiment of the present invention, there is provided a method for processing mortgage information using a financial system including, for example, evaluating the mortgage information stored in the one or more staging tables using one or more triggers such that any one of the one or more triggers is satisfied based on one or more predetermined conditions; identifying one or more rules, when at least one of the one or more triggers is satisfied; retrieving stored mortgage information from at least one of the one or more staging tables to form retrieved information, when at least one of the one or more triggers is satisfied; and transforming the retrieved information into one or more outputs based on at least one of the one or more rules.

It is to be understood that both the foregoing general description and the following detailed description are exemplary and explanatory only and are not restrictive of the invention, as described. Further features and/or variations may be provided in addition to those set forth herein. For example, the present invention may be directed to various combinations and subcombinations of the disclosed features and/or combinations and subcombinations of several further features disclosed below in the detailed description.

BRIEF DESCRIPTION OF THE DRAWINGS

The accompanying drawings, which are incorporated in and constitute a part of this specification, illustrate various embodiments and aspects of the present invention and, together with the description, explain the principles of the invention. In the drawings.

DETAILED DESCRIPTION

Reference will now be made in detail to the invention, examples of which are illustrated in the accompanying drawings. Wherever possible, the same reference numbers will be used throughout the drawings to refer to the same or like parts.

Figure 1:
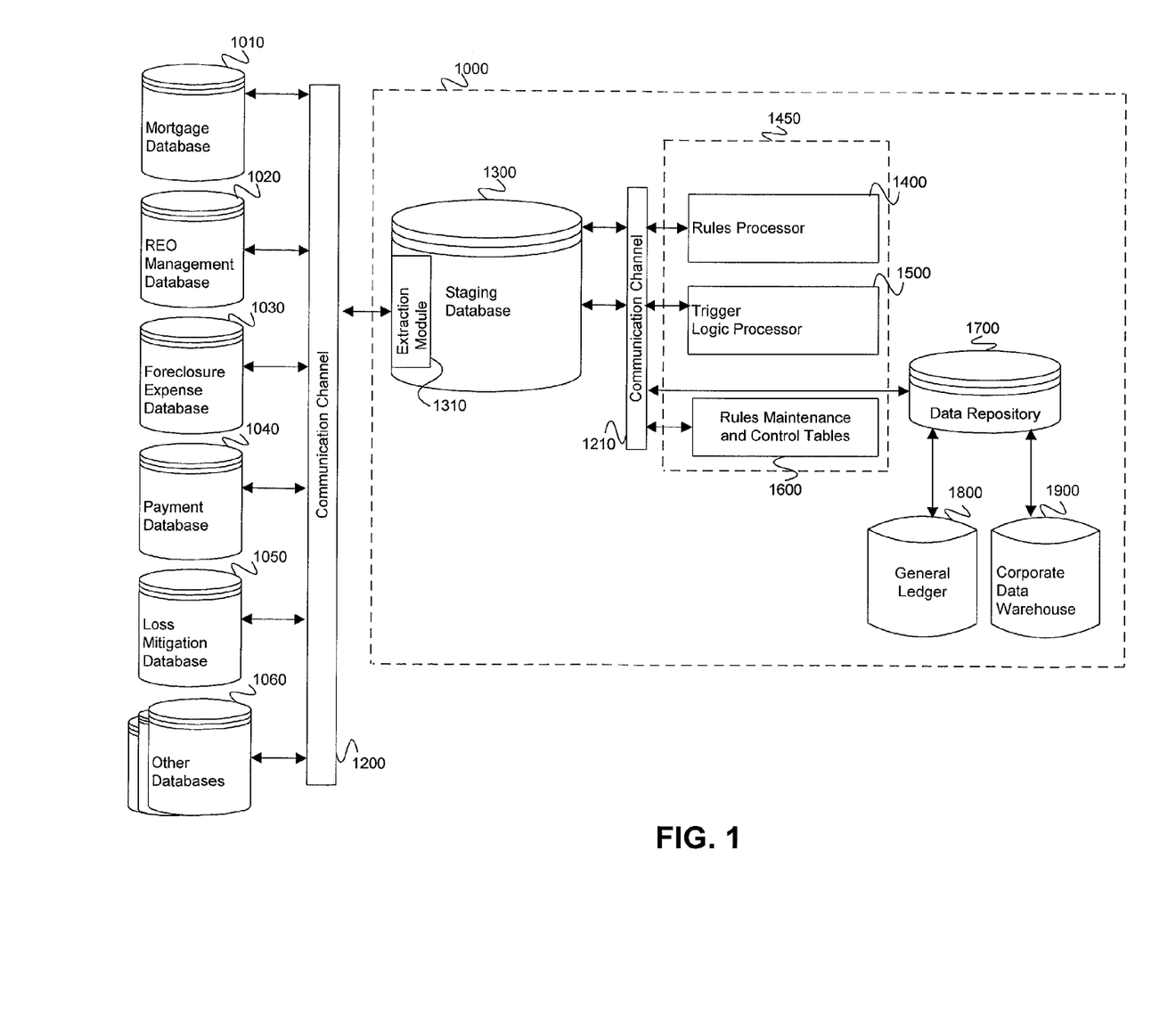
FIG. 1 illustrates an exemplary system environment in accordance with methods and systems consistent with the present invention.

FIG. 1 shows an exemplary system environment in accordance with methods and systems consistent with the present invention. Referring to FIG. 1, FIG. 1 includes one or more sources of information 1010-1060, one or more communication channels 1200 and 1210, a staging database 1300, an extraction module 1310, a rules processor 1400, a trigger logic processor 1500, rules maintenance and control tables 1600, a data repository 1700, a general ledger 1800, and a corporate data warehouse 1900. The rules engine processor 1450 further includes a rules processor 1400, a trigger logic processor 1500, and rules maintenance and control tables 1600.

In one embodiment, the one or more sources of information may include various sources of financial information, such as a mortgage database 1010 for storing information associated with mortgages owned or serviced by a financial institution (e.g., a mortgagor or a mortgage servicer); a real estate owned (REO) management database 1020 for storing information associated with a mortgage that has been foreclosed and thus owned by the financial institution; a foreclosure expense database 1030 for storing information associated with a foreclosure; a payment database 1040 for storing payment information associated with real estate owned by a mortgagor or in foreclosure status; a loss mitigation database 1050 for storing information associated with mitigating losses from a potential foreclosure by negotiating or working out a reduction in the mortgagee's interest rate or mortgage payments; and other business databases 1060 as necessary to process financial data.

Moreover, the one or more sources of information 1010-1060 may include a legacy database application that resides on a mainframe; an external database that is maintained by an independent entity or organization, such as a independent corporation or department; and/or a client/server database supporting a specific business function such as mortgage processing or loan servicing.

The mortgage database 1010 may contain detailed information about one or more mortgages. For each of the one or more mortgages, the mortgage database 1010 may store a name for the mortgagee, an address for a mortgaged property, a mortgage amount corresponding to the original mortgage, a name for a mortgage servicer, a mortgage payment history, an interest rate, a principal amount, a remaining balance, and/or other detailed information associated with a mortgage.

The REO database 1020 may include all the activity associated with a mortgage in foreclosure status. The property securing a mortgage in foreclosure status becomes real estate owned by a mortgagor or current note holder. For example, if a mortgagee defaults on a mortgage, the property may undergo a foreclosure transferring title to the mortgagor. This ownership by the mortgagor is commonly referred to as "real estate owned." Once the mortgagor owns the property, the REO database 1020 may store all the financial activity associated with the foreclosed mortgage.

The foreclosure expense database 1310 may include information associated with expenses incurred while a mortgage is in foreclosure status.

The payment database 1040 may store payment information related to reimbursing vendors for expenses incurred when a mortgage is in foreclosure status or real estate owned. This information may include check number, payment date, payment amount, vendor name, and invoice number.

The loss mitigation database 1050 may include information associated with negotiating a work-out with a mortgagee to avoid foreclosure. For example, if a mortgagee is delinquent on a mortgage payment, the mortgagor may foreclose on the property securing the mortgage. Alternatively, the mortgagor may decide to negotiate a work-out with the mortgagee to prevent foreclosure. The workout may be in the form of a refinancing arrangement that results in reduced interest and/or reduced monthly mortgage payments. Since the work-out may result in a financial loss to the mortgagor, the mortgagor may take a charge-off or loss on the mortgage.

The other business databases 1060 may contain other sources of business information including, for example, independent appraisals of the property, a performance rating for a mortgage servicer, credit history of a mortgagee, and/or other information that may facilitate processing mortgage information to yield one or more outputs, such as outputs compatible with standard accounting and business practices.

The sources of information 1010-1060 may be connected to a communication channel 1200. The communication channel 1200 facilitates communication between one or more sources of information 1010-1060 and a financial system 1000. The communication channel may include, for example, a telephony-based network, a local area network (LAN), a wide area network (WAN), a dedicated intranet, the Internet, and/or a wireless network. Moreover, any combination of wired and/or wireless components may be incorporated into the communication channel 1200. Furthermore, any suitable combination of point-to-point or network communications may also be incorporated into communication channel 1200 to facilitate communication between the one or more sources of information 1010-1060 and the financial system 1000. Although the one or more sources of information 1010-1060 are shown as being separate from the financial system 1000, the one or more of the sources of information 1010-1060 may be co-located with the financial system 1000 instead.

The staging database 1300 may include one or more relational and/or object-oriented databases. In one embodiment, a database application, such as an Oracle database stores the staging database 1300. Moreover, the staging database 1300 may include one or more staging tables that store data from the one or more sources of information 1010-1060; and an extraction module 1310 that exchanges data with each of the one or more sources of information 1010-1060.

In one embodiment, the extraction module 1310 may link to the mortgage database 1010, extract information from the mortgage database 1010, convert the information in the mortgage database 1010 into a predetermined format compatible with the financial system 1000, and write the converted information into one or more staging tables stored in the staging database 1300. Furthermore, the extraction module 1310 may exchange or extract information from each of the one or more sources of information 1010-1060 based on an event, such as the arrival of new data in the mortgage database 1010. Alternatively, the extraction module 1310 may exchange or extract information on a periodic basis, such as a daily pull from the one or more sources of information 1010-1060. For example, the extraction module 1310 may pull data from each of the one or more sources of information, eliminating the need for each of the one or more sources of information 1010-1060 to push data to the financial system 1000. The staging database 1300 may thus serve as a central storage area with a common predetermined format for the financial system 1000.

Figure 2:
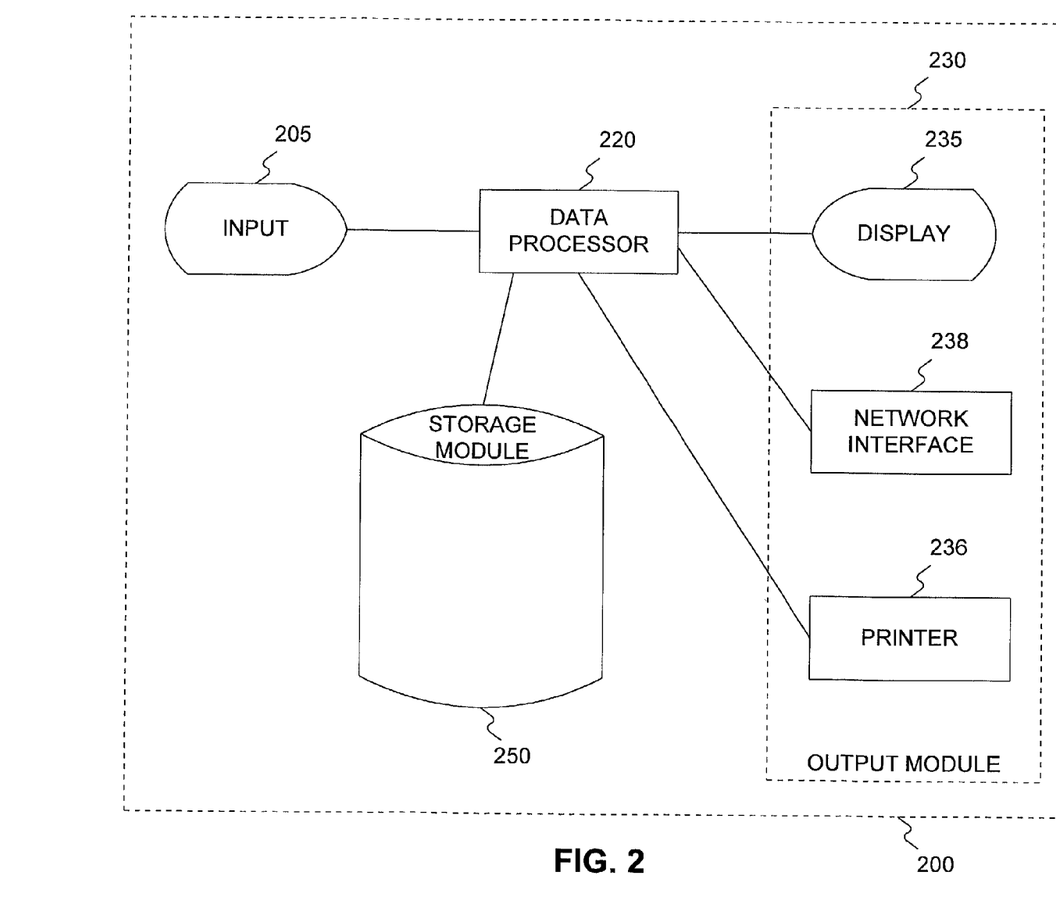
FIG. 2 is a general block diagram of an exemplary processor in which methods and systems consistent with the present invention may be implemented.

FIG. 2 shows a general block diagram of an exemplary processor in which the systems and methods consistent with the present invention may be implemented. The financial system 1000 and/or one or more of the components, subsystems, and functions therein may be implemented in a processor, such as computer 200. Referring to FIG. 2, the computer 200 includes an input module 205, a data processor 220, a storage module 250, and an output module 230. The output module 230 includes a display 235, a printer 236, and a network interface 238.

The input module 205 of FIG. 2 may be implemented with a variety of devices to receive a user's input and/or provide the input to the data processor 220. Some of these devices (not shown) may include, for example, a network interface card, a modem, a keyboard, a mouse, and an input storage device.

Although FIG. 2 illustrates only a single data processor 220, computer 200 may alternatively include a set of data processors. The data processor 220 may also include, for example, one or more of the following: one or more central processing units, a co-processor, memory, registers, and other data processing devices and systems as appropriate.

The storage module 250 may be embodied with a variety of components or subsystems including, for example, a hard drive, an optical drive, a general-purpose storage device, a removable storage device, and/or other devices capable of storing. Further, although storage module 250 is illustrated in FIG. 2 as being separate or independent from data processor 220, the storage module 250 and data processor 220 may be implemented as part of a single platform or system.

Figure 3:
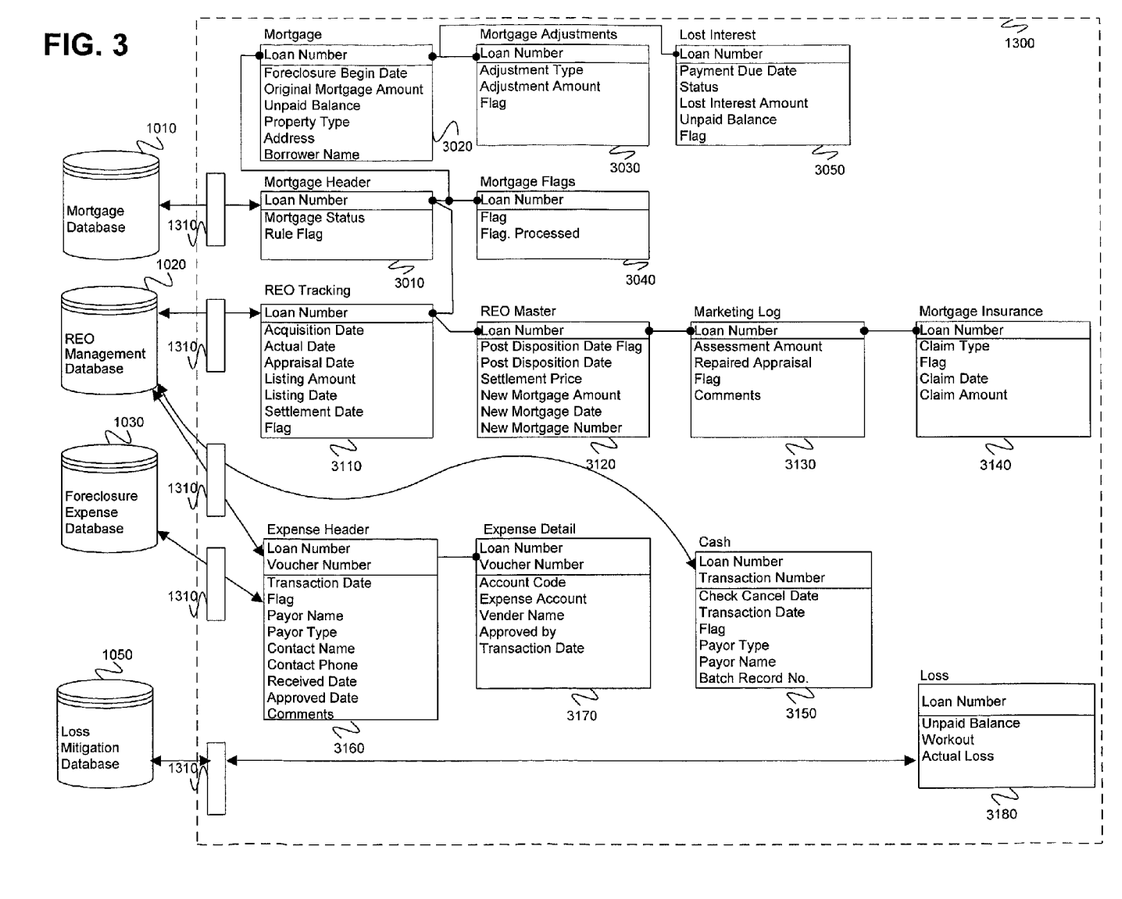
FIG. 3 shows exemplary tables for storing financial information in accordance with methods and systems consistent with the present invention.

FIG. 3 shows exemplary staging tables stored in the staging database 1300. In one embodiment, the extraction module 1310 may extract detailed mortgage information from one or more sources of information, such as the mortgage database 1010; convert the extracted detailed mortgage information into a predetermined format compatible with the financial system 1000. The extraction module 1310 may then store the converted mortgage information in one or more staging tables, such as the mortgage staging tables 3010-3050 of the financial system 1000.

In the embodiment of FIG. 3, the extraction module 1310 may store general mortgage information in a mortgage header table 3010 that includes, for example, a loan number; mortgage status information, such as whether the mortgage is classified as active, delinquent, foreclosed, real estate owned, or settled (i.e., an REO property that has been sold); and a flag indicating whether one or more rules have processed or transformed the information stored in the mortgage header table 3010.

The mortgage header table 3010 may be linked to a mortgage table 3020 that stores detailed mortgage information including, for example, a date of foreclosure, an original mortgage amount; an address for a property; an unpaid balance amount that remains on the mortgage; a type for the property (e.g., multifamily, residential, or commercial); and a name for a borrower or mortgagee.

The mortgage flags staging table 3040 stores a list that includes each of the rules that have processed a particular loan number and when such processing occurred.

The mortgage adjustments table 3030 may store information associated with any adjustments to a mortgage resulting from expenses, income, lost income, a change to a fair market value associated with the mortgage on a property, and/or other financial or accounting adjustments to the mortgage. The mortgage adjustments table 3030 may include, for example, an adjustment amount; an adjustments type; and a flag indicating whether one or more rules have processed or transformed the information stored in the mortgage adjustments table 3030.

The lost interest staging table 3050 may store information associated with interest fees that are lost when a mortgagee is delinquent with a mortgage payment. For example, when a mortgagee is delinquent with a mortgage payment, the lost interest staging table 3050 would include a due date for a payment; a status indicating degree of delinquency, such as the number of months that the mortgage has been in a delinquent status; an amount corresponding to interest fees lost because of the mortgagee's late payment(s); a total amount corresponding to the sum of the unpaid payments; and a flag indicating whether one or more rules have processed the information stored in the lost interest staging table 3050.

The extraction module 1310 may also extract information from the real estate owned management database 1020. The extraction module 1310 may extract information from the REO management database 1020, convert the extracted information, and store the extracted information into one or more staging tables 3110-3160. For example, the extraction module may store the extracted information in a REO tracking staging table 3110, and a REO master staging table 3120, a marketing staging table 3130, a mortgage insurance staging table 3140, a cash staging table 3150, and/or an expense header 3160.

The REO tracking staging table 3110 may store status information associated with a property that is owned by a mortgagor. The REO tracking staging table 3110 may include, for example, a loan number; various dates associated with a mortgage such as an acquisition date indicating when a mortgagor assumed ownership of a property; an appraisal date indicating when an appraisal was made; a settlement date; an expected closing dates; an amount corresponding to an advertised or listed price for the property; a date corresponding to when a property was listed; and a flag indicating whether one or more rules have processed or transformed the information stored in the REO tracking staging table 3110.

The REO master staging table 3120 may include a loan number; a date for disposition of a property, such as a sale of a property to another mortgagee creating a new mortgage for a property; a settlement price; a new mortgage amount, if applicable after settlement; a new mortgage date; a new mortgage number; and a flag indicating whether one or more rules have processed or transformed the information stored in the REO master staging table 3120.

The marketing staging table 3130 may contain information to establish a value for a property and include, for example, a loan number; an assessment amount; an appraisal amount; one or more comments, such as a comment describing the appraisal amount; and a flag indicating whether one or more rules have processed or transformed the information stored in the marketing staging table 3130.

The mortgage insurance staging table 3140 may store information associated with a mortgage insurance claim. For example, when a mortgage is in a foreclosed status and includes mortgage insurance, the mortgagor may file a mortgage insurance claim to recover a portion of the unpaid balance on the insured mortgage. The mortgage insurance staging table 3140 includes, for example, a loan number; a type corresponding to the type of claim; a claim date; a claim amount; and a flag indicating whether one or more rules have processed the information stored in the mortgage insurance staging table 3140. In addition, the mortgage insurance staging table 3140 may include other insurance information, such as a mortgagee's insurance information.

The cash staging table 3150 may store information associated with cash received from an REO property disposition and includes, for example, a loan number; a transaction number associated with the disposition; a cancelled check date received from the disposition; a transaction date for the disposition; a name corresponding to a payor of the cancelled check; a type associated with the payor (e.g., a servicer); and a batch record number with additional detail describing cash received.

The expense header staging table 3160 may include information associated with the REO management database 1020 and the foreclosure expense database 1030. The expense header staging table 3160 may store detailed information for expenses incurred during the disposition of a property. For example, when the property is owned by the mortgagor or under foreclosure, expenses incurred (e.g., a tax payment or a roof repair) may be stored in the expense header staging table 3160. In the embodiment of FIG. 3, the expense header staging table 3160 includes, for example, a loan number; a voucher number for the expense; a date corresponding to a transaction, such as when the expense was incurred; a name for a payor of the expense; a type associated with the payor; a contact name and phone; received and approved dates; and a comments field.

The expense detail staging table 3170 may include information associated with expenses for a property. The expense detail staging table 3170 may include a loan number; a voucher number for the expense; an account code for the expense; an expense account from which the expense amount is charged; a vendor name associated with the expense; a name of a person approving the expense; and a transaction date for the expense.

The loss staging table 3180 may contain loss mitigation information including, for example, a loan number; an amount corresponding to an unpaid balance on a mortgage; an actual loss amount corresponding to a work-out amount; and an actual loss. For example, if a mortgagee has a principal balance of $100,000 that is unpaid and is unable to make mortgage payments under the current interest and payment schedule, the loss staging table 3180 may include the unpaid balance of $100,000 and a work-out amount of $10,000 representing a work-out, such as a reduction in the mortgage interest rate or mortgage payment.

Although FIG. 3 shows four sources of information 1010-1030 and 1050, additional sources of information may also be used. Moreover, although the staging tables 3010-3180 are shown within a single database 1300, the staging tables may be distributed among several databases. Furthermore, although the staging tables are linked according to loan number, other approaches of organizing the staging tables may be used.

The trigger logic processor 1500 may be a separate processor or computer, such as computer 200 that queries the staging database 1300 through a communication channel 1210. Alternatively, the trigger logic processor 1500 may be integral to the staging database 1300. The trigger logic processor 1500 may include, for example, one or more triggers or conditions to identify and analyze information stored in the staging database 1300. In particular, each trigger may launch or trigger one or more rules that process or transform the information stored in the staging database 1300 into one or more outputs, such as posting to a subledger, ledger, and/or report.

The trigger logic processor 1500 may identify information in the staging database 1300 that needs to be pulled or retrieved for processing by the rules engine processor 1450. For example, the trigger logic processor 1500 may include a trigger that identifies when an expense is received on a real estate owned property. When the expense is received by the staging database 1300 for a real estate owned property, the trigger identifies the received expense, and retrieves the expense information contained in the expense staging tables 3160 and 3170. The retrieved information from the staging tables 3160 and 3170 may then be provided to the rules processor 1400 for additional processing by one or more rules.

Each trigger in the trigger logic processor 1500 may also identify one or more rules that should be applied to transform the retrieved information into an output. Moreover, each trigger may also be associated with a predetermined sequence for the one or more rules to generate one or more outputs, such as one or more entries in a subledger, a ledger, or a business report.

When the trigger logic processor 1500 retrieves information stored in the one or more staging tables, the rules processor 1400 may then process the retrieved information with the one or more rules in a predetermined sequence to provide one or more outputs. For example, the rules processor 1400 may include a property valuation rule. A trigger is set to identify when an appraisal is received on real estate owned by the mortgagor, retrieve information (e.g., appraisal information) stored in one or more staging tables, and identify the property valuation rule to process the appraisal. Using the property valuation rule, the rules processor 1400 may then process the appraisal value from the staging table; compute an estimated market value based on the appraisal value; and output the estimated market value to a subledger entry in a data repository 1700 where the estimated market value is posted as a debit entry for estimated market value and a credit entry for loan loss reserve.

In one embodiment, the REO management database 1020 may store an appraisal on real estate owned by the mortgagor. The extraction module 1310 may retrieve the appraisal from the REO management database 1020 on, for example, a daily basis and convert the appraisal from a format associated with the REO management database 1020 into a predetermined format compatible with the staging database 1300. When the appraisal is stored in the REO staging tables 3110, 3120, the trigger logic processor 1500 may include an appraisal trigger that identifies the appraisal as being new information and retrieves the appraisal information from the REO tracking staging table 3110 and REO master staging table 3120.

When the trigger logic processor 1500 retrieves the appraisal information from the REO tracking staging table 3110 and the REO master staging table 3120, the trigger logic processor 1500 may provide the retrieved information to the rules processor 1400. Furthermore, the trigger for an appraisal on a real estate owned property may also be associated with one or more rules and with a sequence for the one or more rules. In this example, the appraisal trigger identifies an appraisal rule (i.e., appraisal for real estate owned equals estimated market value) that assigns a value from the appraisal to the subledger entry for estimated market value. The rules processor 1400 may then proceed to output the estimated market value into the data depository 1700 and, in particular, a subledger that includes a debit entry for estimated market value and a credit entry for loan loss reserve. The output information may also be reflected in a general ledger 1800, reported in a financial report, and/or stored in the corporate data warehouse 1900.

The rules maintenance and control tables 1600 may be stored in a database. The rules maintenance tables provide variable and other types of non-static data necessary to process information from the staging database 1300 and to generate an appropriate financial output for the data repository 1700. For example, the rules maintenance tables may include variable interest rate information. The rules control tables may store static information necessary to process staging table information stored in the staging database 1300. For example, rules control tables may store one or more rules that are executed by the rules processor 1400. Moreover, for each of the one or more rules, the rules control tables may store one or more triggers that may invoke each rule; a sequence when more than one rule is executed based on a trigger; a definition for a rule describing the steps associated with processing information into one or more outputs.

The data repository 1700 may include a subledger. The subledger may record accounting activity, such as debits and credits, and act as a subledger for a general ledger 1800. For example, summaries from the subledger are reflected in the general ledger 1800. In one embodiment, the general ledger may include a single debit reflecting all capital expenses for a mortgagor while the subledger that is stored in the data depository 1700 may include separate capital expense debits for each financial transaction made in connection with one or more mortgages owned by the mortgagor.

The data repository 1700 may also include a corporate data warehouse 1900 that further includes a database for storing financial information, such as reports and for analyzing stored financial information.

Figure 4:
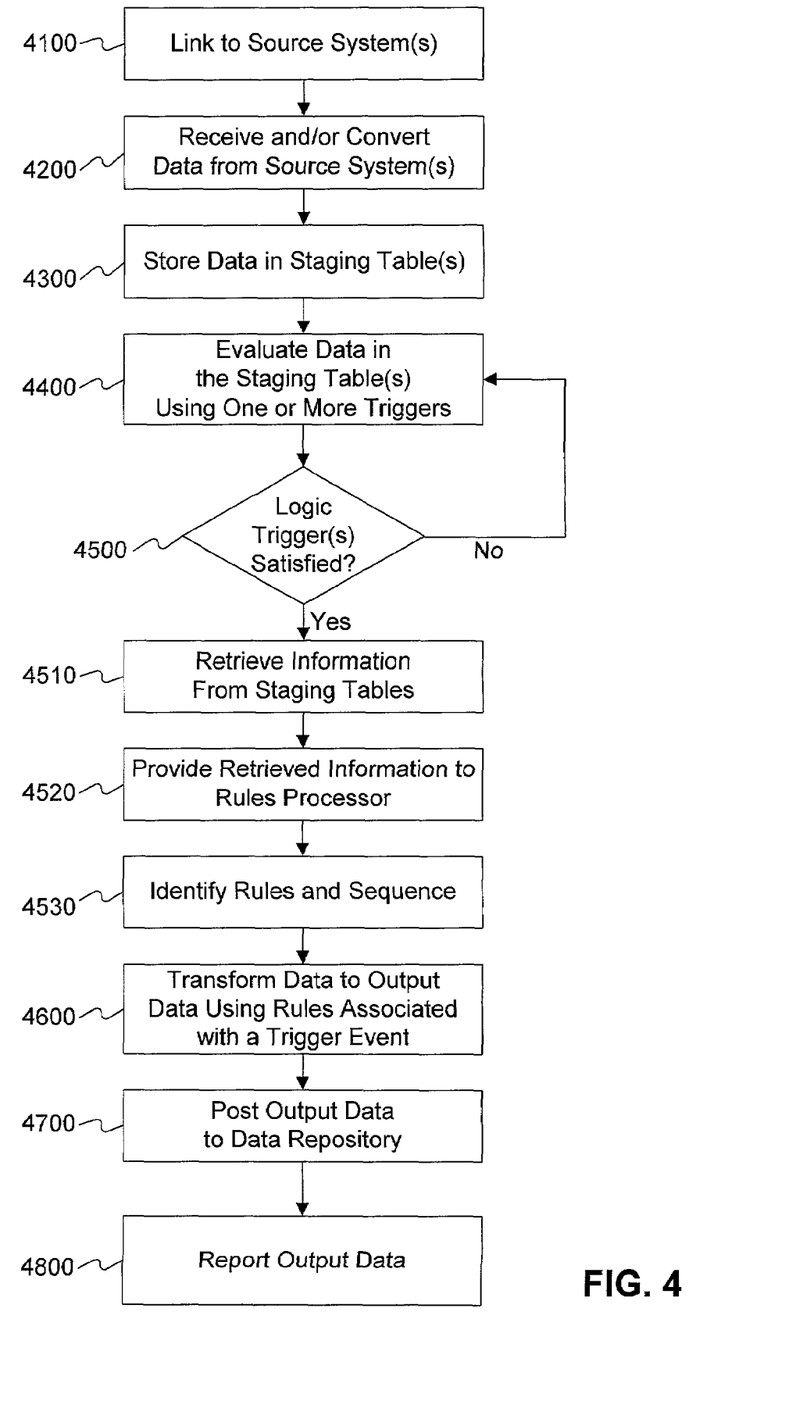
FIG. 4 is an exemplary flowchart for processing financial data in accordance with methods and systems consistent with the present invention.

FIG. 4 shows exemplary steps for processing financial information using the financial system 1000. Referring to FIG. 4, the extraction module 1310 may link to the one or more sources of information 1010-1060 (step 4100); receive or extract and, if required, convert the received information into a predetermined format that is compatible with the financial system 1000 (step 4200); and store the received information in one or more staging tables of the staging database 1300 (step 4300). The trigger logic processor 1500 may then evaluate the stored information using one or more triggers (step 4400). If the trigger logic processor 1500 determines that at least one of the one or more triggers is satisfied (step 4500), the trigger logic processor 1500 may retrieve information from the one or more staging tables associated with the at least one trigger (step 4510); provide the retrieved information from the one or more staging tables to the rules processor 1400 (step 4520); identify one or more rules and a sequence for executing the one or more rules (step 4530); transform the retrieved information into one or more outputs using the one or more rules (step 4600); post or map the one or more outputs to the data repository 1700 (step 4700). Moreover, the data repository 1700 may generate financial reports, subledgers, ledgers, and/or other outputs consistent with standard accounting or business practices (step 4800).

In one embodiment, the trigger logic processor 1500 includes a trigger to recognize if an REO property has a mortgage insurance claim (referred to hereinbelow as a mortgage insurance trigger). In this example, the extraction module 1310 may link to the one or more sources of information 1010-1060 (step 4100); receive and, if required, convert the received information into a format that is compatible with the staging database 1300 (step 4200); and store the received information in one or more staging tables of the staging database 1300 (step 4300). For example, the extraction module 1310 may link to a legacy database system that contains mortgage claim information stored in a proprietary format (step 4100); extract and convert the received mortgage claim information into a format that is compatible with an Oracle database application hosting the staging database 1300 (step 4200); and store the received information in one or more staging tables of the staging database 1300 (step 4300). Alternatively, a spreadsheet application may be configured or customized to extract information from a database, such as one of the other business databases 1060, convert and then store the extracted information into one or more staging tables.

To evaluate the information stored in the staging tables using one or more triggers (step 4400), the trigger logic processor 1500 may then evaluate the staging database 1300 using the mortgage insurance trigger to recognize if a real estate owned property has a mortgage insurance claim. For example, the trigger logic processor 1500 evaluates the REO tracking staging tables 3110 and the mortgage insurance staging tables 3140 using the mortgage insurance trigger to recognize a financial event, such as receiving a claim against a property's mortgage insurance.

If the trigger logic processor 1500 determines that the mortgage insurance trigger is satisfied (step 4500) (i.e., receiving a mortgage insurance claim), the trigger logic processor 1500 may retrieve information from the one or more staging tables (e.g., the REO tracking staging table 3110 and the mortgage insurance staging table 3140) associated with the mortgage insurance trigger (step 4510) and provide the retrieved information to the rules processor 1400 (step 4520). Alternatively, the trigger logic processor 1500 may retrieve the one or more staging tables and provide the retrieved one or more staging tables to the rules processor 1400.

The mortgage insurance trigger may be also associated with one or more rules and a sequence for executing the one or more rules (step 4530). By identifying one or more rules and a sequence for these rules that are stored in the rules maintenance and control tables, the rules processor 1400 may transform the retrieved information into one or more outputs using the one or more rules (step 4600). For example, the identified rules may process or transform the retrieved information to determine an output, which in this case is an amount due to the mortgagor based on the corresponding amount of the mortgage insurance claim. The rules processor 1400 may also determine that the amount due is simply the claim amount from the mortgage insurance staging table 3140.

The rules processor 1400 may then proceed to output the amount due on the mortgage insurance claim by posting to a debit field for mortgage insurance receivable and a credit field for estimated mortgage insurance (step 4700). The posted debit and credit fields may then be stored in the subledger of the data depository 1700. Furthermore, the debit and credit fields of the subledger may be reflected in a general ledger that includes one or more subledgers. The rules processor 1400 may also output the amount due on the mortgage insurance claim to other subsystems or systems for reporting, analyzing, or processing financial information (step 4800).

In another exemplary embodiment, trigger logic processor 1500 may include a trigger that recognizes when expenses are received in the staging database 1300. This expense trigger may evaluate one or more staging tables (step 4400), such as the expense header staging table 3160 and expense detail staging table 3170 to determine whether an expense has been received that requires processing by the rules processor 1400. If the expense trigger is satisfied (i.e., an expense is received and requires processing) (step 4500), the trigger logic processor 1500 may retrieve information from the expense header staging table 3160 and expense detail staging table 3170 (step 4510) including making an annotation in the flag field of the expense header staging table 3160; provide the retrieved information to the rules processor 1400 (step 4520); and identify to the rules processor 1400 one or more rules and a sequence for these rules (step 4530).

To transform the retrieved information (step 4600), the rules processor 1400 may output expense information from the staging tables 3160 and 3170 to debit and credit fields of a subledger stored in the data depository 1700 by posting or mapping the expense information to a debit for expense and a credit for real estate owned payable (step 4700). The data repository 1700 may also report, analyze, or process financial information (step 4800).

In another exemplary embodiment, the trigger logic processor 1500 may include a trigger that recognizes a settlement. This settlement trigger may evaluate whether a property is sold and what proceeds are received from the settlement. Moreover, the settlement trigger may evaluate one or more staging tables including, for example, the REO tracking staging table 3110 to determine whether a settlement has occurred and must be processed by the rules processor 1400.

For example, if a settlement date appears on the REO tracking staging table 3110, the settlement trigger is satisfied (step 4500). The trigger logic processor 1500 updates a flag in the REO tracking staging table 3110 and then retrieves information from the REO tracking staging table 3110 (step 4510); provides the retrieved information from the REO tracking staging table 3110 to the rules processor 1400 (step 4520); and identifies one or more rules and a respective sequence for the rules processor 1400 (step 4530). The rules processor 1400 may then use the one or more identified rules to process the retrieved information (e.g., the settlement date and a settlement price) by first posting to a debit for real estate owned (REO) sales proceeds, which may be stored in the data depository 1700. The rules processor module 1400 may then also determine the appropriate credit by calculating an expense and posting the expense to a credit for capital expenses, which may also be stored in the data depository 1700. In this example, the rules processor 1400 may finally subtract the posted capital expenses from the REO sales proceeds to determine another credit for an actual market value, which is also posted in the subledger. As a result, the sequence of the one or more rules may permit multiple debit and credit postings that are interrelated.

The financial system 1000 including, for example, the staging database 1300, the extraction module 1310, the rules processor 1400, the trigger logic processor 1500, the rules maintenance and control tables 1600, the data repository 1700, the general ledger 1500, and the corporate data warehouse 1900, may be embodied in various forms including, for example, a processor, such as the computer 200 that also includes a database. Moreover, the above-noted features and other aspects and principles of the present invention may be implemented in various environments. Such environments and related applications may be specially constructed for performing the various processes and operations of the invention or they may include a general purpose computer or computing platform selectively activated or reconfigured by code to provide the necessary functionality. The processes disclosed herein are not inherently related to any particular computer or other apparatus, and may be implemented by a suitable combination of hardware, software, and/or firmware. For example, various general purpose machines may be used with programs written in accordance with teachings of the invention, or it may be more convenient to construct a specialized apparatus or system to perform the required methods and techniques.

Furthermore, although the embodiments above refer to processing information related to mortgages, systems and methods consistent with the present invention may process information related to loans or other financial data.

Systems and methods consistent with the present invention also include computer readable media that include program instruction or code for performing various computer-implemented operations based on the methods and processes of the invention. The media and program instructions may be those specially designed and constructed for the purposes of the invention, or they may be of the kind well-known and available to those having skill in the computer software arts. Examples of program instructions include for example machine code, such as produced by a compiler, and files containing a high level code that can be executed by the computer using an interpreter.

What is claimed is:

1. A method for processing loan information using a financial system, comprising:
  receiving loan information for one or more loans from one or more source systems;
  storing the loan information in one or more staging tables, the staging tables organizing, for each loan, the loan information into categories;
  establishing one or more triggers, each trigger identifying one or more rules;
  identifying one or more satisfied triggers by evaluating the loan information stored in the one or more staging tables associated with the one or more triggers being evaluated;
  retrieving, from the one or more staging tables, the loan information for each category required to execute the one or more rules for the satisfied triggers;
  executing the one or more rules on the retrieved loan information; and
  updating the loan information using results of executing the one or more rules.

2. The method of claim 1, further comprising:
  linking the one or more source systems to the financial system.

3. The method of claim 1, further comprising:
  storing the results in a data repository.

4. The method of claim 3, further comprising:
  reporting the results of executing the one or more rules.

5. The method of claim 4, further comprising:
  defining the one or more source systems to include loan information for one or more mortgages.

6. The method of claim 1, wherein receiving further comprises:
  converting the received loan information to a predetermined format for the financial system.

7. The method of claim 1, wherein the one or more rules define a process for estimating the value of property.

8. The method of claim 7, wherein
  the retrieved loan information includes a real estate owned tracking staging table and a real estate owned master staging table, and
  the results include the value.

9. The method of claim 1, wherein the one or more triggers are satisfied upon at least one of a foreclosure of a property; a sale of a property; a transfer of a property; a property becoming real estate owned by a mortgagor; occurrence of an expense transaction; and occurrence of an income transaction.

10. A method for processing loan information using a financial system, comprising:
  receiving loan information for one or more loans from one or more source systems;
  storing the loan information in one or more staging tables, the staging tables organizing, for each loan, the loan information into categories;
  establishing one or more triggers, each trigger identifying one or more rules;
  identifying one or more satisfied triggers by evaluating the loan information stored in the one or more staging tables associated with the one or more triggers being evaluated;
  sequencing the one or more rules based on the satisfied triggers;
  retrieving, from the one or more staging tables, the loan information for each category required to execute the one or more rules for the satisfied triggers;
  executing the one or more rules on the retrieved loan information; and
  updating the loan information using the results of executing the one or more rules.

11. The method of claim 10, wherein sequencing further comprises:
  ordering the one or more rules based on standard accounting practices that are compatible with double-entry accounting.

12. The method of claim 11, further comprising:
providing the results of executing the one or more rules to a corporate data warehouse.

13. The method of claim 10, further comprising:
defining a data repository to include a subledger for providing entries and for providing journal entries to a general ledger; and
providing the results of executing the one or more rules to the data repository.

14. A financial system for processing loan information, said financial system comprising:
at least one memory including code comprising:
code that receives loan information for one or more loans from one or more source systems;
code that stores the loan information in one or more staging tables, the staging tables organizing, for each loan, the loan information into categories;
code that establishes one or more triggers, each trigger identifying one or more rules;
code that identifies one or more satisfied triggers by evaluating the loan information stored in the one or more staging tables associated with the one or more triggers being evaluated;
code that retrieves, from the one or more staging tables, the loan information for each category required to execute the one or more rules for the satisfied triggers;
code that executes the one or more rules on the retrieved loan information; and
code that updates the loan information using the results of executing the one or more rules; and
at least one processor that executes said code.

15. The financial system of claim 14, wherein the at least one memory further comprises:
code that links the one or more source systems to the financial system.

16. The financial system of claim 14, wherein the at least one memory further comprises:
code that stores the results of executing the one or more rules in a data repository.

17. The financial system of claim 14, wherein the at least one memory further comprises:
code that reports the results of executing the one or more rules.

18. The financial system of claim 14, wherein the at least one memory further comprises:
code that defines the one or more source systems to include loan information for one or more mortgages.

19. A computer-readable media having computer-readable code which, when run on a computer, causes the computer to process loan information, comprising the following computer-readable code for effecting actions in the computer:
code for receiving loan information for one or more loans from one or more source systems;
code for storing the loan information in one or more staging tables, the staging tables organizing, for each loan, the loan information into categories;
code for establishing one or more triggers, each trigger identifying one or more rules;
code for identifying one or more satisfied triggers by evaluating the loan information stored in the one or more staging tables associated with the one or more triggers being evaluated;
code for retrieving, from the one or more staging tables, the loan information for each category required to execute the one or more rules for the satisfied triggers;
code for executing the one or more rules on the retrieved loan information; and
code for updating the loan information using the results of executing the one or more rules.

20. A system for processing loan information using a financial system, comprising:
means for receiving loan information for one or more loans from one or more source systems;
means for storing the loan information in one or more staging tables, the staging tables organizing, for each loan, the loan information into categories;
means for establishing one or more triggers, each trigger identifying one or more rules;
means for identifying one or more satisfied triggers by evaluating the loan information stored in the one or more staging tables associated with the one or more triggers being evaluated;
means for retrieving, from the one or more staging tables, the loan information for each category required to execute the one or more rules for the satisfied triggers;
means for executing the one or more rules on the retrieved loan information; and
means for updating the loan information using the results of executing the one or more rules.

21. A method for processing mortgage information using a financial system, comprising the steps of:
establishing one or more triggers, each trigger identifying one or more rules;
identifying one or more satisfied triggers by evaluating the mortgage information for one or more mortgages stored in one or more staging tables associated with the one or more triggers being evaluated, the staging tables organizing, for each mortgage, the mortgage information into categories;
retrieving, from the one or more staging tables, mortgage information for each category required to execute the one or more rules for the satisfied triggers;
executing the one or more rules on the retrieved mortgage information; and
updating the mortgage information using the results of executing the one or more rules.

22. A computer-readable media having computer-readable code which, when run on a computer, causes the computer to process loan information, comprising the following computer-readable code for effecting actions in the computer:
code for receiving loan information for one or more loans from one or more source systems;
code for storing the loan information in one or more staging tables, the staging tables organizing, for each loan, the loan information into categories;
code for establishing one or more triggers, each trigger identifying one or more rules;
code for identifying one or more satisfied triggers by evaluating the loan information stored in the one or more staging tables associated with the one or more triggers being evaluated;
code for sequencing the one or more rules based on the satisfied triggers;
code for retrieving, from the one or more staging tables, the loan information for each category required to execute the one or more rules for the satisfied triggers; and
code for executing the one or more rules on the retrieved loan information; and
code for updating the loan information using the results of executing the one or more rules.

23. The computer program product of claim 22, wherein said code for sequencing orders the one or more rules based on standard accounting practices that are compatible with double-entry accounting.

24. The computer program product of claim 22, further comprising:
   code for defining a data repository to include a subledger for providing entries and for providing journal entries to a general ledger; and
   code for providing the results of executing the one or more rules to the data repository.

25. The computer program product of claim 22, further comprising:
   code for providing the results of executing the one or more rules to a corporate data warehouse.

26. A system for processing loan information using a financial system, comprising:
   means for receiving loan information for one or more loans from one or more source systems;
   means for storing the loan information in one or more staging tables, the staging tables organizing, for each loan, the loan information into categories;
   means for establishing one or more triggers, each trigger identifying one or more rules;
   means for identifying one or more satisfied triggers by evaluating the loan information stored in the one or more staging tables associated with the one or more triggers being evaluated;
   means for sequencing the one or more rules based on the satisfied triggers;
   means for retrieving, from the one or more staging tables, the loan information for each category required to execute the one or more rules for the satisfied triggers;
   means for executing the one or more rules on the retrieved loan information; and
   means for updating the loan information using the results of executing the one or more rules.

27. The system of claim 26, wherein said means for sequencing orders the one or more rules based on standard accounting practices that are compatible with double-entry accounting.

28. The system of claim 26, further comprising:
   means for defining a data repository to include a subledger for providing entries and for providing journal entries to a general ledger; and
   means for providing the results of executing the one or more rules to the data repository.

29. The system of claim 26, further comprising:
   means for providing the results of executing the one or more rules to a corporate data warehouse.

\* \* \* \* \*